United States Patent Office 3,654,351
Patented Apr. 4, 1972

3,654,351
PURIFICATION OF AROMATIC POLYCARBOXYLIC ACIDS BY RECRYSTALLIZATION
Enrique Roberto Witt, Corpus Christi, Tex., assignor to Celanese Corporation, New York, N.Y.
No Drawing. Filed Nov. 18, 1969, Ser. No. 877,842
Int. Cl. C07c 51/42
U.S. Cl. 260—525                                  11 Claims

ABSTRACT OF THE DISCLOSURE

A process for purifying crystalline aromatic polycarboxylic acids by recrystallization from liquid mixtures of 0 to 92% by weight water and 8 to 100 percent by weight of a phenol. For example terephthalic acid may be purified by recrystallization from a liquid mixture containing 30% phenol and 70% water.

BACKGROUND OF THE INVENTION

The present invention relates to the purification of crystalline, aromatic polycarboxylic acids, particularly terephthalic acid.

In recent years the production of aromatic polycarboxylic acids has become of significant commercial interest because of their use in the manufacture of such products as polyester synthetic fibers such as polyethylene terephthalate. One of the major problems in producing a polyester from an aromatic polycarboxylic acid is the obtaining of a high purity polycarboxylic acid starting material since very small amounts of various impurities will adversely affect the polymer. The most notable adverse effect of most impurities in a polycarboxylic acid starting material is that these impurities cause discoloration of the polyester.

The various adverse impurities in an aromatic polycarboxylic acid generally are those arising during the course of its manufacture and therefore the particular impurities present may vary according to the process of manufacture. At the present time there are several methods for producing aromatic polycarboxylic acids, one widely used method being the oxidation of the corresponding alkyl-substituted aromatic compounds. Thus terephthalic acid may be produced by the oxidation of p-xylene or p-diisopropylbenzene. These oxidations of alkyl-substituted aromatics may be conducted for example by oxidizing in the liquid phase with nitric acid either with or without added air or oxygen. Another method for the oxidation of an alkyl-substituted aromatic is in the liquid phase with an oxygen-containing gas (such as air) and in the presence of a heavy metal catalyst such as cobalt acetate or other Group VIII metal salts. The production of polycarboxylic acids is not however limited to the oxidation of alkyl-substituted aromatics. For example the production of terephthalic acid by the rearrangement of potassium salts of benzoic acid or phthalic acid is well known. Such rearrangements are generally known as Henkel rearrangements.

Regardless of the method of manufacture the aromatic polycarboxylic acid will generally contain various impurities which are detrimental to polyester production, especially from the standpoint of color. Although all of the troublesome impurities have not been identified the most common impurities are aromatic aldehydic and ketonic compounds as well as heavy metals such as cobalt.

Various processes have been devised for the removal of impurities from carboxylic acids including charcoal treatment of solutions of water soluble salts, alkaline oxidation with hypohalite or permanganate solutions of water soluble salts, water-leaching, recrystallization from water and the like. However these purification processes have generally not proved to be sufficient or economical enough from the standpoint of commercial production to produce a fiber-grade acid.

SUMMARY

It is thus an object of the present invention to provide a process for the purification of an aromatic polycarboxylic acid such as terephthalic acid. A more particular object of the present invention is to provide an improved process for the purification of an aromatic polycarboxylic acid by recrystallization. Additional objects will become apparent from the following description of the present invention.

These and other objects are accomplished by the present invention which in one of its aspects is a process for the purification of a crystalline aromatic polycarboxylic acid comprising forming a solution of said aromatic polycarboxylic acid in a liquid medium comprising from about 0 to 92 percent by weight of water and 8 to 100 percent by weight of a monoatomic phenol, recrystallizing the aromatic polycarboxylic acid from solution and recovering the thus recrystallized aromatic polycarboxylic acid.

DESCRIPTION OF THE PREFERRED EMBODIMENTS

As may be seen from the above, the present invention is relatively simple as it merely involves a recrystallization. The invention resides in the use of a monoatomic phenol alone or in admixture with water as it has been discovered that recrystallization of an aromatic polycarboxylic acid from such a solvent results in considerable purification of the acid. By monoatomic phenol is meant that the phenolic compound contains only one phenolic hydroxyl group. The preferred monoatomic phenols for use in the present process are those of 6–15 carbon atoms and being of the formula

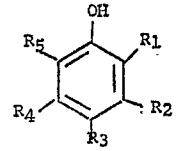

wherein $R_1$, $R_2$, $R_3$, $R_4$, and $R_5$ may be hydrogen, alkyl, alkaryl, aryl, or aralkyl radicals. Among the particular phenols that may be utilized are phenol, o-cresol, m-cresol, p-cresol, mixed cresol and xylenols. Of the various phenols that may be utilized phenol itself is preferred over the others.

The liquid utilized as the recrystallization solvent may only be the monoatomic phenol itself or may be a mixture of the monoatomic phenol and water. However mixtures of the phenol and water are much preferred over the straight phenol itself. In general the recrystallization solvent should contain at least 8% by weight of the phenol in order to obtain adequate purification with the preferred solvent comprising from about 18 to 55 percent by weight of the monoatomic phenol and 45 to 82 percent by weight water. When the solvent contains more than about 55 weight percent phenol, the removal of various organic impurities such as aromatic aldehydes and ketones is quite good and in some cases better than with solvents containing less than 55 weight percent phenol. However when using a phenol-rich solvent the removal of heavy metals is generally less than desired. Furthermore when using a solvent which is extremely rich in a phenol, losses of the polycarboxylic acid due to esterification with the phenol becomes high and for some commercial processes these losses tend to offset the extra degree of purification obtained by use of a solvent rich in phenol. These esters do not present a problem of contaminating the product however since they are much more soluble than the carboxylic acids themselves and will thus generally remain in solution in the mother liquor upon recrystallization of the carboxylic acid. It is pointed out however that the losses due to esterification are drastically reduced if the mother liquor which contains the esters in solution is recycled to the dissolution zone. The reason for this is that this recycle will contain almost the equilibrium amount of the esters and therefore very little "new" ester formation will occur. When recycling the mother liquor a blowdown will usually be required to prevent buildup of various impurities such as heavy metal impurities. As the phenol content of a solvent drops below about 8%, the degree of removal of organic impurities lessens and the color of the purified carboxylic acid borders on the unacceptable. It is however emphasized that solvent containing between 8 to 20 percent by weight of a phenol are operative and do provide adequate purification above that obtained in many of the prior art processes.

Although the carboxylic acid being purified may be present in the polycarboxylic acid-solvent mixture in varying proportions, the polycarboxylic acid should generally be present in amounts of less than 30 percent by weight, for example, 1 to 30 percent by weight, based on the total combined weight of polycarboxylic acid and solvent. Larger amounts may be used but unduly high temperatures will be required in order to get the polycarboxylic acid into solution. It is preferred that the polycarboxylic acid-solvent mixture contain about 10 to 25 percent by weight of the polycarboxylic acid.

The temperatures required for dissolution of the polycarboxylic acid will vary according to the relative amounts of polycarboxylic acid and solvent present and also according to the makeup of the solvent. It can be generally stated that the temperatures during dissolution will be on the order of from 270 to 370 degrees, usually 290 to 340° C. Recrystallization of the polycarboxylic acid from solution may be effected by merely cooling or by any other of the means well-known in the art. Thus the cooling can be accompanied by reduction in pressure such as in a vacuum recrystallizer. Likewise the recrystallization may take place in a series of steps such as the recrystallization of terephthalic acid from water disclosed in Belgian Pat. 681,180 and Netherlands Pat. 6606773.

The polycarboxylic acids that may be purified according to the present invention may vary widely and contain various impurities; the main limitation on the aromatic carboxylic acid is that it be free of aldehydic and ketonic carbonyl groups. As pointed out before all of the impurities in polycarboxylic acids have not been identified and therefore the impurities present are best characterized by describing the method of which the polycarboxylic acid is prepared. The present invention is best suited for purifying aromatic carboxylic acids which have been produced by oxidation of the corresponding alkyl aromatic compound. Many of the impurities from such oxidation processes are due to incomplete oxidation such as aromatic aldehyde and ketone impurities. For example, p-xylene is oxidized to terephthalic acid, the crude terephthalic acid generally contains various impurities which are the result of incomplete oxidation such as p-toluic acid, p-carboxybenzaldehyde, p-acetylbenzoic acid, 3,6-fluorenone dicarboxylic acid, 4,4'-benzophenone dicarboxylic acid, and the like. The aromatic polycarboxylic acids to which the present invention is most applicable are those free of aldehydic and ketonic carbonyl group of the formula

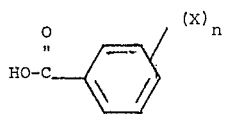

wherein X is a carboxyl group or a radical 7 to 12 carbon atoms containing a single carboxyl substituted aromatic ring, said radical being composed only of carbon, hydrogen, and oxygen atoms, and wherein $n$ is a number of 1 or 2, preferably 1. Of the various acids that may be purified the benzene dicarboxylic acids are most suitable with the present invention being especially suitable for the purification of terephthalic acid. Other acids that may be purified include o-phthalic acid, isophthalic acid, 4,4-diphenyldicarboxylic acid, 4,4'-diphenylmethane dicarboxylic acid, di (4-carboxyphenyl) ether, 1,2-ethylenedioxy dibenzoic acid, 4,4'-thiodibenzoic acid, 4,4'-sulphonyl dibenzoic acid, trimesic acid.

The following examples are given in order to illustrate specific embodiments of the present invention.

EXAMPLE I

Several runs were made in order to purify crude terephthalic acid which had been produced by the air oxidation of p-xylene in the presence of a cobalt acetate catalyst. The crude terephthalic acid was yellowish in color and contained as impurities about 2900 p.p.m. of 4-carboxybenzaldehyde, about 1600 p.p.m. of toluic acid and 205 p.p.m. of cobalt. The APHA color of the crude terephthalic acid in a 5% dimethyl formamide solution was about 25. In each of the runs a slurry consisting of 15% by weight crude terephthalic acid and 85% by weight of solvent was heated to about 300–325° C. so as to cause dissolution of the terephthalic acid. Following dissolution the solution was cooled to room temperature so as to cause recrystallization of the terephthalic acid. The recrystallized terephthalic acid was recovered by filtration, washed thoroughly with water, dried, weighed and analyzed. Upon cooling to room temperature to recrystallize the terephthalic acid, the esters which had formed remained in solution. The solvent utilized in each run was a fresh solvent consisting either of pure phenol, of a mixture of phenol and water in varying proportions, or of pure water itself. The following Table I indicates the composition of the solvent utilized in each run and the results obtained including the percentage of the terephthalic acid which was lost through esterification. In Table I all percentages, ratios, and etc., are expressed on a weight basis. TPA stands for terephthalic acid, TA for toluic acid, CBA for 4-carboxybenzaldehydic and Co for cobalt. The terephthalic acid product from each run was white in appearance.

TABLE I

| Run No. | Solvent composition, phenol/H₂O | TPA esterification losses, percent | TPA product, p.p.m. | | | Color, APHA [1] |
|---|---|---|---|---|---|---|
| | | | CBA | TA | Co | |
| 1 | 100/0 | 61.5 | 20 | 55 | 150 | <5 |
| 2 | 95/5 | 22.2 | 10 | 20 | 60 | 10 |
| 3 | 80/20 | 5.1 | 15 | <20 | 2 | 5 |
| 4 | 60/40 | 2.1 | 15 | 45 | 2 | 5 |
| 5 | 40/60 | 1.6 | 24 | 50 | 1 | <5 |
| 6 | 20/80 | 1.2 | 31 | <20 | 1 | 10 |
| 7 | 10/90 | 1.0 | 86 | <20 | 1 | 5 |
| 8 | 0/100 | 0 | 790 | 150 | 80 | 25 |

[1] As measured as a 5% solution in dimethyl formamide.

EXAMPLE II

In order to purify crude terephthalic acid containing 5200 p.p.m. of a 4,4'-carbonyl dibenzoic acid (benzophenone dicarboxylic acid) impurity, a slurry containing 15% by weight of the crude terephthalic acid and 85% by weight of a solvent consisting of 90 wt. percent phenol and 10 wt. percent water was heated to about 325° C. so as to dissolve the terephthalic acid. After dissolution the solution was cooled to room temperature to recrystallize the terephthalic acid from solution. The recrystallized terephthalic acid was recovered by filtration and analysis showed it contains less than 50 p.p.m. of the 4,4'-carbonyl dibenzoic acid impurity.

EXAMPLE III

A crude terephthalic acid containing about 3000 p.p.m. of 4-carboxybenzaldehyde was added to a liquid mixture of 90 wt. percent mixed cresols-10 wt. percent water so as to form a slurry containing 15 percent by weight of terephthalic acid. The slurry was heated to about 300 to 330° C. so as to dissolve the terephthalic acid whereupon it was cooled so as to cause recrystallization of the terephthalic acid. The thus recrystallized terephthalic acid contained about 30 p.p.m. of 4-carboxybenzaldehyde.

EXAMPLE IV

The experiment of Example III was repeated using dry 2, 6-dimethyl phenol as a solvent. The recrystallized terephthalic acid contained about 100 p.p.m. of 4-carboxybenzaldehyde impurities.

EXAMPLE V

When Example III is repeated for the purification of 4,4' carboxyphenyl ether containing 3500 p.p.m. of aldehydic acid corresponding to the above as an impurity, the recrystallized ether contains 20 p.p.m. of the above impurity.

EXAMPLE VI

This example illustrates the recycling of mother liquor which contains the phenolic esters formed during dissolution of the aromatic carboxylic acid. A series of five runs was made in each of which a fresh charge of crude terephthalic acid was purified. The crude terephthalic acid was yellowish in color, contained 2900 p.p.m. of 4-carboxybenzaldehyde impurities and had an APHA color of 25 as measured in the 5% dimethyl formamide solution. The solvent for the first run consisted of a fresh mixture of 80 weight percent phenol-20 weight percent water and the solvent for each succeeding run consisted of about 80% of the mother liquor from the preceding run plus 20% of fresh makeup solvent, the makeup solvent corresponding to the original 80:20 phenol-water mixture. In each run a 15 weight percent slurry of the crude terephthalic acid in the solvent was heated to about 325° C. so as to dissolve the terephthalic acid and then cooled to room temperature causing recrystallization of the terephthalic acid. The terephthalic acid was recovered by filtration, and sent to analysis. The filtrate or mother liquor was saved and, after a 20% blowdown, was utilized in the next succeeding run as mentioned above. Esterification losses and the terephthalic acid product analyses are shown in the following Table II. Terephthalic acid recovered in each run was white in appearance.

TABLE II

| Run No. | TPA esterification losses, percent | TPA product CBA, p.p.m. | TPA product Color, APHA [1] |
| --- | --- | --- | --- |
| 1 | 5.1 | 15 | 5 |
| 2 | 2.9 | 29 | 5 |
| 3 | 2.9 | <10 | 10 |
| 4 | 2.8 | 29 | 10 |
| 5 | 2.3 | <5 | 5 |

[1] As measured in a 5% dimethyl formamide solution.

As may be seen from Table II the esterification losses were reduced in the runs utilizing a recycled solvent.

What is claimed is:

1. A process for the purification of a crystalline aromatic polycarboxylic acid produced by the oxidation of an alkyl-substituted aromatic compound, said purified aromatic polycarboxylic being free of aldehydic and ketonic carbonyl group, comprising steps of
    (a) forming a solution of said aromatic polycarboxylic acid in a liquid medium comprising a mixture of from about 0 to 92 percent by weight water and 8 to 100 percent by weight of a monoatomic phenol,
    (b) recrystallizing the aromatic polycarboxylic acid from solution
    (c) recovering the thus recrystallized aromatic polycarboxylic acid.

2. The process of claim 1 wherein said aromatic polycarboxylic acid is one having been produced by the oxidation of an alkyl-substituted aromatic compound and wheresaid monoactomic phenol contains 6 to 15 carbon atoms and is of the formula

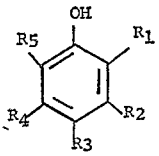

wherein $R_1$, $R_2$, $R_3$, $R_4$ and $R_5$ are hydrogen, alkyl, aryl, alkaryl or aralkyl radicals.

3. The process of claim 2 wherein said aromatic polycarboxylic acid is terephthalic acid.

4. The process of claim 2 wherein said solution of the aromatic polycarboxylic acid in the liquid medium contains from about 10 to 25% by weight of the aromatic polycarboxylic acid.

5. The process of claim 2 wherein said solution is formed at a temperature within the range of about 270 to 370° C.

6. The process of claim 2 wherein said monoatomic phenol is phenol;

7. The process for the purification of terephthalic acid produced by the liquid phase oxidation of p-xylene and containing 4-carboxybenzaldehyde impurities which comprises
    (1) forming a solution of the impure terephthalic acid in a liquid mixture containing from 0 to 92 percent by weight water and from 8 to 100 percent by weight of a phenol containing 6 to 15 carbon atoms, said phenol containing 6–15 carbon atoms and being of the formula

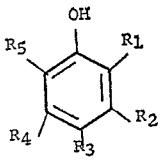

wherein $R_1$, $R_2$, $R_3$, $R_4$, and $R_5$ are hydrogen, alkyl, alkaryl, aryl, or aralkyl radicals.
    (2) recrystallizing the terephthalic acid from solution, and
    (3) recovering the thus crystallized terephthalic acid containing less of said 4-carboxybenzaldehyde impurities than originally contained in the terephthalic acid.

8. The process of claim 7 wherein said liquid mixture comprises from about 18 to 55 percent by weight of said monoatomic phenol and from about 45 to 82 percent by weight of water.

9. The process of claim 7 wherein said monoatomic phenol is phenol.

10. The process of claim 8 wherein said monoatomic phenol is phenol.

11. The process of claim 10 wherein said solution is formed at a temperature within the range of from about 290 to 340° C.

References Cited

UNITED STATES PATENTS 2,838,565  6/1958  Heath et al. _____ 260—525

FOREIGN PATENTS 695,566  8/1953  Great Britain _____ 260—525
1,049,720  11/1966  Great Britain _____ 260—525

JAMES A. PATTEN, Primary Examiner

R. S. WEISSBERG, Assistant Examiner